UNITED STATES PATENT OFFICE.

ALEC E. SHERMAN, OF LONDON, ENGLAND.

ANTISEPTIC OR STERILIZING AGENT FOR USE IN THE PRESERVATIVE TREATMENT OF FOOD.

1,274,793.

Specification of Letters Patent.

Patented Aug. 6, 1918.

No Drawing.

Application filed March 7, 1918. Serial No. 221,062.

*To all whom it may concern:*

Be it known that I, ALEC EDWARD SHERMAN, a subject of the King of Great Britain, and residing in London, England, have invented certain new and useful Improvements in or Relating to Antiseptic or Sterilizing Agents for Use in the Preservative Treatment of Food, of which the following is a specification.

This invention relates to the preservation of meat, and more particularly to an antiseptic and sterile treatment which is given thereto preparatory to chilling the same, and in which the essential antiseptic, or sterilizing, agent is derived from a vegetable source, is relatively free from pungent odors, is harmless to human life, and is very effective in destroying bacilli molds and yeast spores.

According to the present invention meat, intended to be preserved by chilling, is preparatory to its preservative treatment by refrigeration in cold stores during transit or storage, subjected to antiseptic and sterilizing treatment, in an atmosphere containing a gas obtained by vaporizing a stearoptene having the formula $C_{10}H_{14}O$. The stearoptene is preferably obtained in the manner described herein, from *Thymus vulgaris*, *Monarda punctata* or the like herbs, or it may be obtained wholly or in part by synthetic methods; and the antiseptic atmosphere, in some cases, may be obtained by vaporizing a chlorinated or saline solution containing the stearoptene.

The meat to be preserved is preferably subjected to a preparatory treatment just after the animal has been slaughtered, and before the carcass has parted with its natural animal heat.

One method of preparing the antiseptic or sterilizing agent according to the invention is as follows:—

The fruit or leaves of such herbs as *Carum copticum*, *Thymus vulgaris*, *Monarda punctata*, or the like herbs which have the stearoptenes described, are bruised and put into a digester with the requisite water; they are then subjected to a temperature corresponding with a pressure of 10 lbs. per square inch for about three hours, after which the liquid contents are drained off; the residues are pressed and the liquid product is added to the said liquid contents, and the liquid so obtained is then distilled. In this way I obtain the essential oil of the herb which contains the stearoptenes.

It is found that the presence of the oleoptenes in the oil does not usually interfere with the preservative action of the vaporized stearoptenes, and, in certain cases, where the odor is not objectionable, the entire essential oil prepared as above may be vaporized to charge the atmosphere in which the meat is located for antiseptic and sterile treatment preparatory to chilling. I find, however, that the odoriferous properties are more intense in the lighter oils and tend to flavor the meat, and I accordingly prefer usually to extract and use the stearoptene only. Preferably I treat the essential oil with caustic soda solution, and reject the undissolved oil. I then treat the alkaline liquid with excess of acid and wash the precipitated product with distilled water; or the stearoptene may be obtained by fractional distillation after treating the oil at low temperature. I may use a synthetically made stearoptene.

I find that the solid stearoptene, if incorporated with a binder such as gum tragacanth can be pressed into tablet form, the size of the tablet being such that when it is vaporized it serves to charge with the sterilizing gas a given number of cubic feet of atmosphere. For example, I find that 2 grams of solid stearoptene are suitable for the effective sterilization of the atmosphere and contents of each 100 cubic feet of chamber.

The tablet form is exceedingly convenient in dry climates, and enables comparatively unskilled attendants to obtain with certainty the desired charge for a given cubical capacity.

I find that when the stearoptene is combined with chlorin for antiseptic purposes, it has the effect of neutralizing the bleaching action of the chlorin on the red coloring matter in the meat, while the chlorin has the effect of greatly reducing the characteristic odor of the stearoptene—thus each tends to improve the preservative action of the other.

In order to obtain this effect, I make a solution of chlorinated water, composed of distilled water 80 parts, sodium carbonate 10 parts, and chlorin gas 5 parts and to these I add the stearoptene; the chlorinated solution readily absorbs the stearoptene, and I find that two to five per cent. by weight is usually all that is required; these proportions give good results, but I do not limit myself to these proportions.

In some cases it is desirable to use a solution of sodium chlorid instead of chlorinated water, in which case I use distilled water 90 parts, sodium chlorid 10 parts. This solution readily absorbs the requisite amount of stearoptene, but the preservative properties of the antiseptic compound when the sodium chlorid solution is employed, will not be as great as are obtained when the chlorinated solution is used; but for periods of meat preservation not exceeding 35 days it is quite suitable.

The sterilizing medium is used as follows:—

The solution or the tablet, as the case may be, is volatilized by heat, and the products directed into the chamber containing the meat to be treated; the meat is treated in this chamber before it parts with its natural animal heat, and is allowed to remain under the action of the gas for a suitable period—usually one hour; it is then taken out of the chamber and goes through the usual processes of dressing and cooling, and where cloths are used they are previously sterilized by the same medium. The meat is then chilled and may be shipped or held in cold stores, after being subjected to the treatment described, for comparatively long periods, without losing the freshness and bloom which is characteristic of freshly killed meat.

The atmosphere of the cold storage chambers is cleaned and dried, but the degree of dryness must be kept absolutely under control, so as to be maintained within those limits which are found not to affect prejudicially the appearance of the meat by drying the surface.

The humidity of the air in the chamber may be brought under complete control, by passing it, before it enters the chambers, through a receptacle containing porous material saturated with sulfuric acid, calcium chlorid, caustic lime or the like.

I claim—

1. The described method of treating meat preliminary to chilling the same, comprising subjecting the meat while in a fresh condition and retaining some of its animal heat to the action of a confined atmosphere containing the vapors of a substance of the thymol class having the formula $C_{10}H_{14}O$.

2. The described method of treating meat preliminary to chilling the same, consisting in subjecting said meat to the action of a confined atmosphere containing vapors consisting of a stearoptene having antiseptic properties and vaporized from a saline solution having deodorizing effect on said antiseptic body.

3. The described method of treating meat preliminary to chilling the same, consisting in subjecting said meat to the action of a confined atmosphere containing vapors of a stearoptene having antiseptic properties vaporized from a chlorinated aqueous solution of sodium carbonate.

4. The improved method of sterilizing meat with the object of preparing it for cold storage treatment so as to prevent it during such treatment from losing its freshness and bloom, which consists in subjecting the meat before it is chilled to an atmosphere containing an antiseptic gas obtained by vaporizing a chlorinated or saline solution containing a stearoptene having the formulæ $C_{10}H_{14}O$; substantially as described.

In witness whereof I set my hand in presence of two witnesses.

ALEC E. SHERMAN.

Witnesses:
JOSEPH A. DULEY,
ERNEST C. PLATT.